Aug. 11, 1936.  F. H. VERCOE  2,050,821
ELEVATING INDUSTRIAL TRUCK
Filed June 7, 1934  2 Sheets-Sheet 1
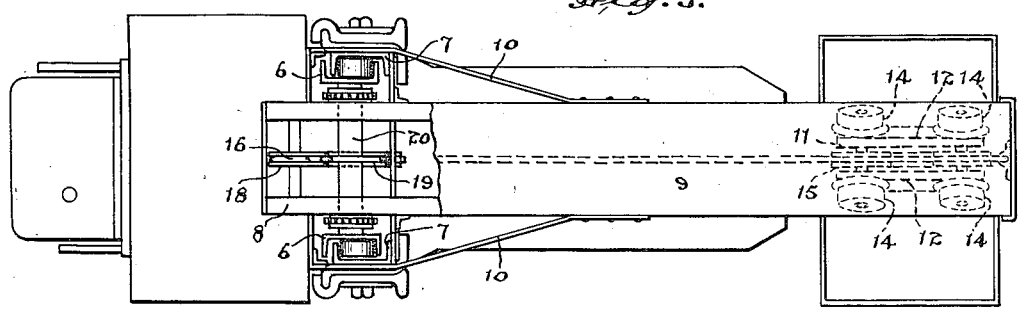
Fig. 3.
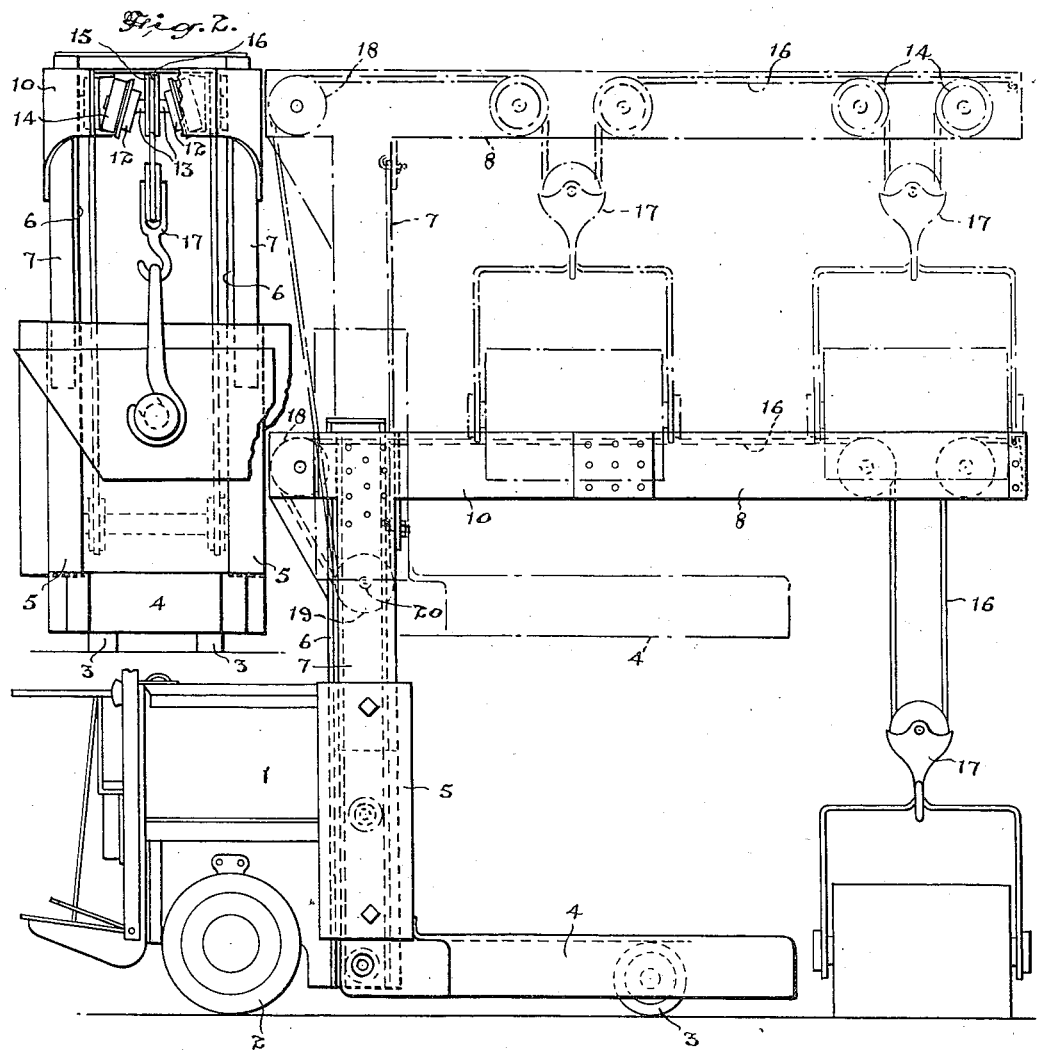
Fig. 2.
Fig. 1.
Inventor.
Frank H. Vercoe.

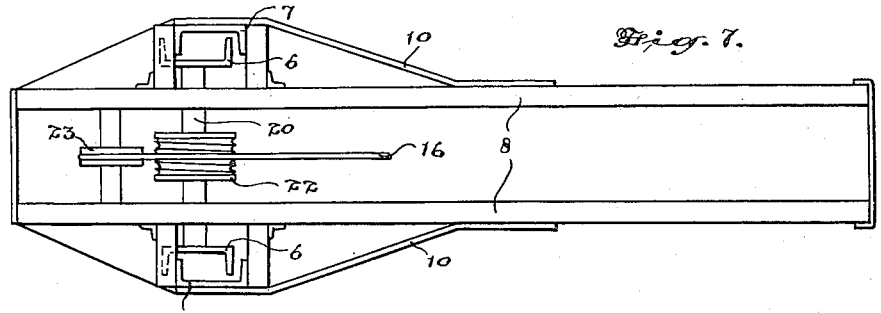
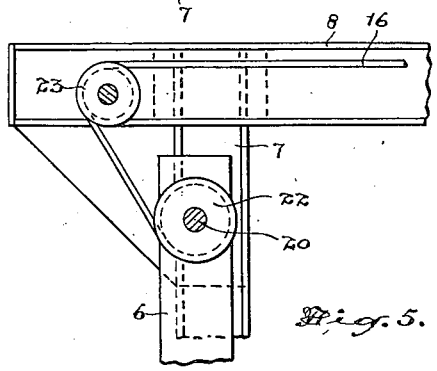
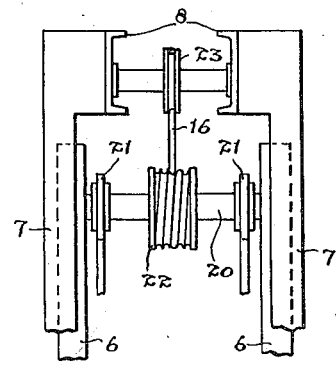
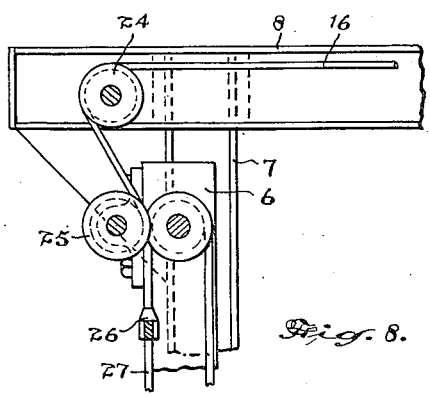
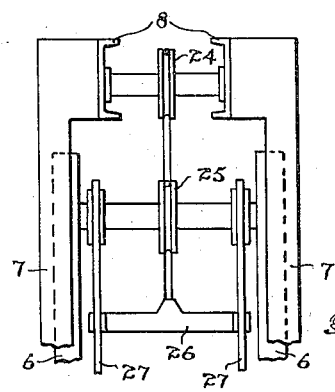
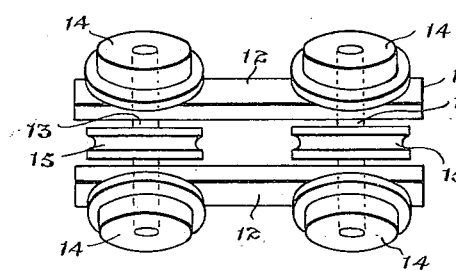

Patented Aug. 11, 1936

2,050,821

UNITED STATES PATENT OFFICE 2,050,821

ELEVATING INDUSTRIAL TRUCK

Frank H. Vercoe, Toronto, Ontario, Canada

Application June 7, 1934, Serial No. 729,349

2 Claims. (Cl. 212—73)

The principal objects of this invention are to provide an industrial truck particularly adapted for use in shifting and transporting loads under factory floor conditions and with which loads may be lifted and carried at varying heights to suit machine operating and storage conditions and particularly to handle loads that require to be lifted and dumped at varying heights.

The principal features of the invention consist in the novel arrangement of a horizontal boom upon an elevating type of truck, the boom being equipped with a traveling trolley from which a load lifting equipment is suspended so that the load may be raised to any desirable height within the range of the elevating mechanism and may be moved horizontally to be placed on the platform.

In the accompanying drawings, Figure 1 is a side elevational view of a truck constructed in accordance with this invention showing the boom in a raised position in dotted lines and also showing the load carrier in various positions.

Figure 2 is a front end elevational view of the truck, parts thereof being broken away.

Figure 3 is a top plan view of my improved truck.

Figure 4 is an enlarged plan view of the trolley which carries the load from the boom.

Figure 5 is a side elevational view of a portion of a modified form of elevating boom and load lifting mechanism.

Figure 6 is an end elevational view of the structure shown in Figure 5.

Figure 7 is a top plan of the structure illustrated in Figure 5.

Figure 8 is a side elevational view of a portion of a further modified form of elevating mechanism.

Figure 9 is an end elevational view of the structure illustrated in Figure 8.

Elevating industrial trucks have been devised in which a carriage mounted on power driven and pony wheels is provided with a vertical standard or guide upon which an L-shaped platform member is arranged to be elevated to various heights, but the present invention contemplates an additional feature in that a crane structure is provided upon which the load may be lifted and moved horizontally.

In the structure herein shown the carriage 1 of the truck is mounted on the power wheels 2 and pony wheels 3 and the platform 4 is provided with a vertical portion 5 which operates on a rigid vertical guide structure 6 forming part of the carriage.

An extension 7 is rigidly connected to the vertical structure 5 and at the upper end of said extension 7 is arranged a horizontal boom 8 which extends over and beyond the extremity of the platform 4.

The boom 8 is preferably formed of a pair of spaced channel beams rigidly connected by a top plate 9, and reinforced by side brace plates 10.

Mounted between the paired horizontal channel bars of the boom is a trolley 11 which may be of any desirable construction, but is here shown formed of a pair of parallel plates 12 connected by the cross spindles 13 upon the upwardly angled ends of which are mounted the flanged wheels 14 which ride on the flanges of the channel bars. Grooved sheaves 15 are journalled on the spindles 13 between the plates 12.

A cable 16 having one end anchored to the outer end of the boom is passed over the sheaves 15 and looped downwardly between them, the loop supporting a hook sheave 17 which is adapted to be connected to the load. The cable extends the length of the boom and passes over a sheave 18 mounted at the inner end of the boom, preferably arranged past the vertical side members and the end is carried downward around a sheave 19 journalled on a cross shaft 20 mounted between the sides of the rigid vertical guide structure 6 of the truck carriage, the terminal end of the cable being secured to the vertically operating extension 7.

The mechanism for raising and lowering the platform is not shown as such is commonly known, but when the platform is raised, the vertical extension carrying the boom, rises with it and as the cable end is secured to the vertically operating member it pulls the end of the cable upwardly around the sheave 19, thus pulling the cable so that the looped end supporting the hook sheave 17 is shortened with a multiple movement which causes the hook sheave to rise quicker than the platform, with the result that the load connected to the hook is raised above the platform with a very slight movement of the boom. This movement continues until the boom rises to its maximum height and the load is moved to the position shown in dotted lines at the outer end of the boom, in Figure 1.

The load being supported on the cable loop suspended from the trolley may be moved lengthwise of the boom to any desired position, the trolley travelling freely in the boom. It will thus be seen that when the load has been lifted to an elevation higher than the platform it may be moved over the platform and then deposited on the platform by lowering same. The hook may then be released and the operation repeated to lift a second load and both loads may be deposited on the platform if it is large enough or it may remain suspended on the hook, and the truck may then be moved about as may be desired.

In unloading, the load may be lifted to any desired height for dumping or depositing at any level within the range of movement of the boom.

It will be readily appreciated that an equipment such as described will enable the quick and accurate handling of goods on production floors and in transferring stock from point to point.

The actual structural features of the crane may of course be varied considerably as may also the arrangement of the load lifting mechanism without departing from the principal features of the invention.

In the form of structure illustrated in Figures 5, 6 and 7, the shaft 20 which carries the lifting chain wheels 21 for elevating the platform, has mounted thereon a sheave in the form of the grooved drum 22 to which the inner end of the hoisting cable 16 is secured so that the cable is wound on or unwound from the drum coincident with the raising or lowering of the platform. The cable is carried over a guide sheave 23 corresponding with the sheave 18 shown in Figure 1 and extends outwardly to the carriage in the same manner as in Figure 1.

In the form illustrated in Figures 8 and 9 the cable extending inwardly from the carriage is passed over the guide sheaves 24 and 25 and is secured to a yoke 26, the ends of which are secured to the platform lifting chains 27.

It will be appreciated that while the several forms of driving mechanism for the hoisting cable herein shown are coupled with the means for raising and lowering the platform a separate motor for operating the hoisting cable may be used.

The device is extremely simple but it greatly enlarges the scope of operation and materially enhances the value of the truck to which it is applied.

What I claim as my invention is:—

1. An elevating industrial truck having in combination an elevating platform for receiving a load, a boom extending horizontally and longitudinally over said platform and beyond the end thereof, a trolley movable on said boom longitudinally of said elevating platform from a position vertically offset from the end thereof to a selected position over said elevating platform, a hoisting cable looped from said trolley, a load supporting sheave supported from said cable loop, and means utilizing the elevating movement of said platform to impart an accelerated lift to said sheave to raise the load more rapidly than the rate of lift of said elevating platform to simultaneously raise the load thereabove and permit it to be deposited thereon, whereby the truck may be backed up to a load with the end of the platform closely adjacent thereto and with the boom thereof projecting over the load, thus permitting the trolley and sheave to be moved on the boom past the end of the platform directly over the load to raise the same above the platform level and then shift the same forwardly onto the platform, and whereby lateral overturning thrusts on the truck are avoided.

2. An elevating industrial truck having a vertically movable platform for receiving a load, a horizontal boom rigidly connected to and movable in unison with said movable platform and disposed in fixed parallel relation longitudinally thereof and extending a substantially distance therebeyond, a trolley movable on said boom longitudinally of said movable platform from a position beyond the end of the platform to a selected position directly above the latter, a cable looped in said trolley, a load-carrying sheave supported in said cable loop, and means for shortening said cable loop coincident with the raising of said vertically movable platform to raise the load above the platform simultaneously with the upward movement of said platform, whereby the truck may be backed up to a load with the end of the platform closely adjacent thereto and with the boom thereof projecting over the load, thus permitting the trolley and sheave to be moved on the boom past the end of the platform directly over the load to raise the same above the platform level and then shift the same forwardly onto the platform, and whereby lateral overturning thrusts on the truck are avoided.

FRANK H. VERCOE.